United States Patent [19]  [11] 4,283,878
Hill et al.  [45] Aug. 18, 1981

[54] INSECT TRAP

[75] Inventors: Alistair C. Hill; Lyn Davies, both of Sittingbourne, England

[73] Assignee: Shell Internationale Research Maatschappij B.V., Netherlands

[21] Appl. No.: 112,792

[22] Filed: Jan. 16, 1980

Related U.S. Application Data

[63] Continuation of Ser. No. 854,784, Nov. 25, 1977, abandoned.

[51] Int. Cl.³ .............................................. A01M 1/14
[52] U.S. Cl. ...................................... 43/114; 43/122; 43/129
[58] Field of Search ................. 43/107, 114, 115, 116, 43/117, 122, 129, 132 R, 133, 136

[56] References Cited

U.S. PATENT DOCUMENTS

| 552,644 | 1/1896 | Matthews | 43/114 |
| 667,294 | 2/1901 | Cherry et al. | 43/115 |
| 1,118,845 | 11/1914 | Day | 43/114 |
| 1,643,118 | 9/1927 | Hahn | 43/114 |
| 1,855,985 | 4/1932 | Plummer | 43/107 |
| 1,857,890 | 5/1932 | Sullivan | 43/107 |
| 2,046,430 | 7/1936 | Rutherford | 43/115 X |
| 2,100,888 | 11/1937 | Vine | 43/114 X |
| 2,974,086 | 3/1961 | Beroza et al. | 43/107 |

FOREIGN PATENT DOCUMENTS 821387 10/1959 United Kingdom .
890925 3/1962 United Kingdom .

Primary Examiner—Gary L. Smith
Assistant Examiner—Robert P. Olszewski
Attorney, Agent, or Firm—Pravel, Gambrell, Hewitt, Kirk, Kimball & Dodge

[57] ABSTRACT

An insect trap which comprises a chimney member adapted to allow a flow of air to be forced therethrough, a reservoir of insect attractant which under the influence of the flow of air is evaporated and borne as a stream of attractant vapor emanating from the chimney member into the surrounding atmosphere, and a tacky substance provided inside the chimney member which will trap flying insects lured therein by the stream of attractant vapor.

8 Claims, 3 Drawing Figures

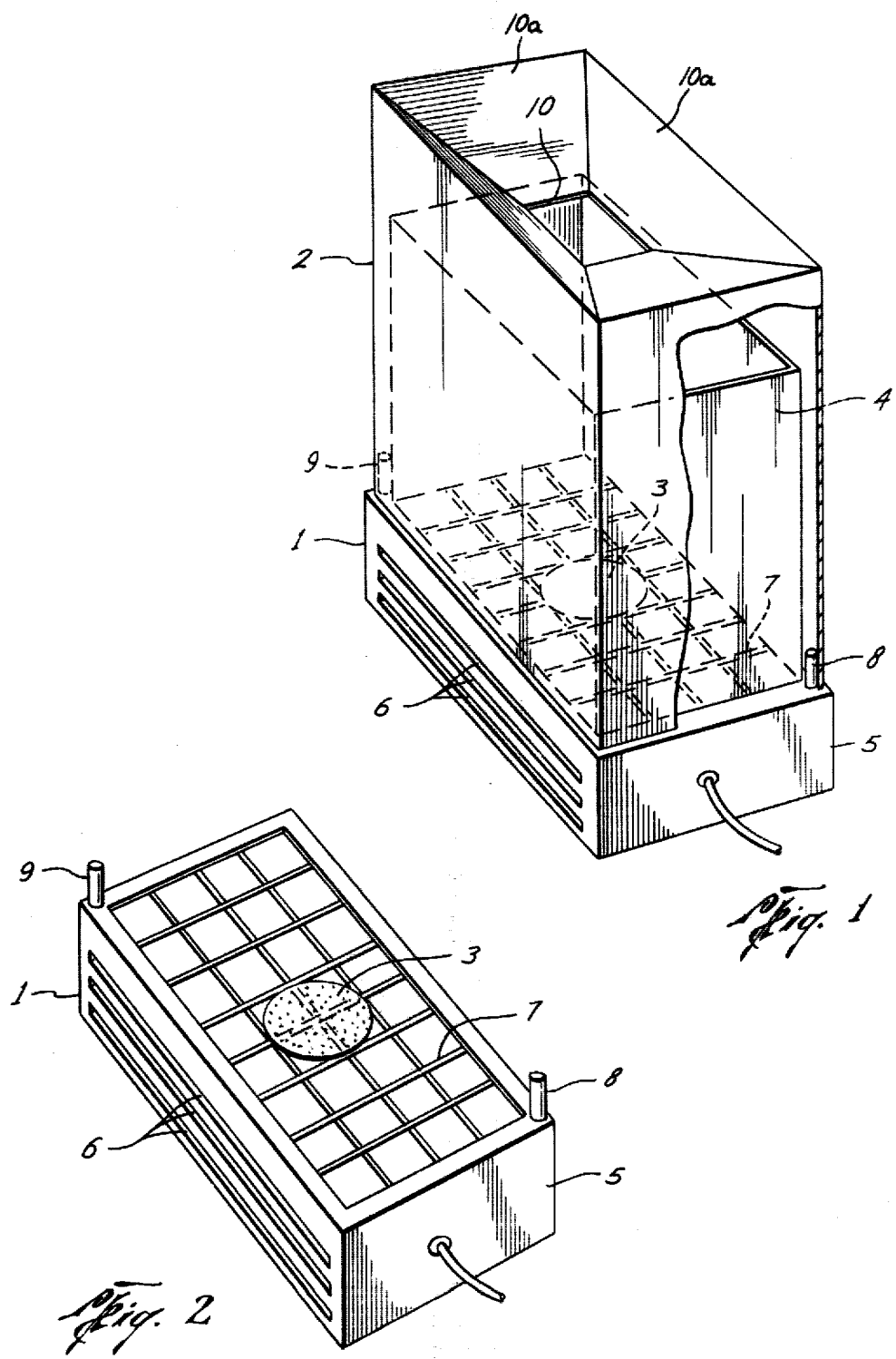

INSECT TRAP

This is a continuation of application Ser. No. 854,784, filed Nov. 25, 1977 now abandoned The present invention relates to an insect trap and, more particularly, to a trap which lures the insects to a tacky substance within the trap.

Insect traps are known which employ attractants to draw the insects thereto and trap them by means of a sticky or tacky substance located in or on the trap.

It has been found that the efficiency of such traps can be considerably improved by ensuring that the attractant is forced into the immediate vicinity of the trap in a controlled manner.

Accordingly, the present invention provides an insect trap which comprises:

a chimney member adapted to allow a flow of air to be forced therethrough;

a reservoir of insect attractant which under the influence of the flow of air is evaporated and borne as a stream of attractant vapor emanating from the chimney member into the surrounding atmosphere, and a tacky substance provided inside the chimney member which will trap flying insects lured therein by the stream of attractant vapor.

In environmental terms the trap according to the invention is particularly advantageous because it succeeds in reducing substantially the flying insect population of a room or other enclosed area without the need of a chemical pesticide.

The essential feature of the insect trap according to the invention is the provision of a stream of insect attractant emanating from the trap and it has been found that, without this feature of forced convection, the efficiency in terms of the insects caught falls off dramatically. The flow of air forced through the chimney may be achieved by means of a fan or a small heater both of which may be powered electrically; it has been found that a small electrically powered heater provided at the base of the chimney produces the desired effect, especially if the insect attractant reservoir, e.g., in the form of a solid disc or pellet, is placed adjacent thereto.

The chimney may be square, rectangular or circular in cross-section although other shapes may be employed if desired, e.g., bowl shape or plate, dish or tray shape. Both ends of the chimney are open or partially open so that a flow of air can be forced therethrough.

In addition to the tacky substance, the heater and the attractant may also be housed within the chimney but it has been found more convenient to mount one end of the chimney over a heater and place the insect attractant reservoir on the heater so that when the heater is in operation it produces convection air currents sufficient to produce the required flow of air and also assist in the evaporation of the attractant from the reservoir.

Better results may be obtained if the end of the chimney remote from the heater, i.e., the end from which the stream of attractant is emanating is provided with a re-entrant hole as flying insects, houseflies especially, find difficulty in escaping from such a chimney having once been lured therein. A re-entrant generally conically shaped hole is particularly useful. The inside of the chimney is preferably light-colored because flying insects prefer entering a light area as opposed to a dark area and further, the outside of the enclosure is preferably a warm or dark color, i.e., a brown, red, black or similar color as such colors attract flying insects.

There are many attractants which may be used to lure flying insects to the trap, for example:

(1) 1,3-propanediol, 1-(3,4-methylenedioxylphenyl)-2-phenyl-;
(2) 3-cyclohexene-1-carboxylic acid, 6-methyl, 2-methylpentyl ester;
(3) 4,7-methanoinden-6-ol-3a,4,5,6,7,7a-hexahydroformate
(4) m-toluic acid, 2-methoxyethyl ester;
(5) m-toluic acid, 2-(2-butoxyethoxy)ethyl ester;
(6) pyran, tetrahydro-2-(2-propynyloxy);
(7) Staley's Bait No. 2;
(8) Staley's Bait No. 7; and
(9) feather meal hydrolysate There are also the naturally occurring pheromones and the following list gives the most important of these together with the species of insect which is affected.

| Chemical name | Insect affected |
| --- | --- |
| 4-(p-hydroxyphenyl)-2-butanone acetate | melon fly, *Dacus cucurbattae* (Coquillett) |
| cis-7,8-epoxy-2-methyloctadecane | gypsy moth, *Porthetria dispar* (L) |
| (Z)-7-hexadecen-o-o-ol acetate | pink bollworm, *Pectinophora gossypiella* (Saunders) |
| (Z)-7-dodecen-1-ol acetate | cabbage looper, *Trichoplusia ni* (Hübner) |
| (Z)-7-dodecen-1-ol | cabbage looper |
| 4-allyl-1,2-dimethoxy benzene | oriental fruit fly, *Dacus dorsalis* (Hendel) |
| (Z)-9-tricosene | housefly, *Musca domestica* (L) |
| phenethylpropionate + eugenol (7:3) | Japanese beetle, *Popillia japonica* (Newman) |
| tert.-butyl-4-(or 5)-chloro-2-methylcyclohexane carboxylate | Mediterranen fruit fly, *Ceratitis capitata* (Weidemann) |

Other compounds that have been shown to be attractive to houseflies can be grouped into the following classes:

(1) Products of putrefaction (mainly amines);
(2) Products of fermentation (aldehydes, ketones and alcohols);
(3) Simple carbohydrates (mono- and di-saccharides);
(4) Esters.

Some of the more effective attractants within these four classes are: skatole, indole, ammonium hydroxide, maltose, acetophenone, benzyl alcohol, pyridine, thymol, dioctyl phthalate, glycerol dioleate, o-mono-oleate, 'Jasmyn,' 'Radoxane,' 'Herboxane.'

For the purposes of trapping the common housefly, *Musca domestica*, the applicant has found that muscalure ((Z)-9-tricosene) or a mixture of that compound with (Z)-9-heneicosene works very effectively in the trap according to the invention. The reservoir for the attractant may take a wide variety of forms, for example it may be in liquid form in a container or alternatively it may be in solid form, for example dispersed in cellulose or mineral absorbents. However, a simple effective reservoir consists of a porous material such as filter paper or blotting paper which is impregnated with the desired attractant and, generally speaking, when discs of paper of about 1 inch diameter are used loadings of about 0.5–150 mg of attractant have been found to give the desired result. If desired, stabilization of the attractant may be achieved by incorporating an anti-oxidant into the reservoir.

The tacky substance which traps the flying insects must clearly be a substance which maintains its tackiness over prolonged periods of time and examples of such substances are solutions of gum, rubber and mineral oil, polybutenes, and mixtures of wax and resins.

The invention will now be further described with reference to the accompanying drawings, in which:

FIG. 1 is a perspective view of one embodiment of an inset trap according to the invention;

FIG. 2 is a perspective view of a heater unit together with an attractant reservoir for the trap shown in FIG. 1;

Figure 3:
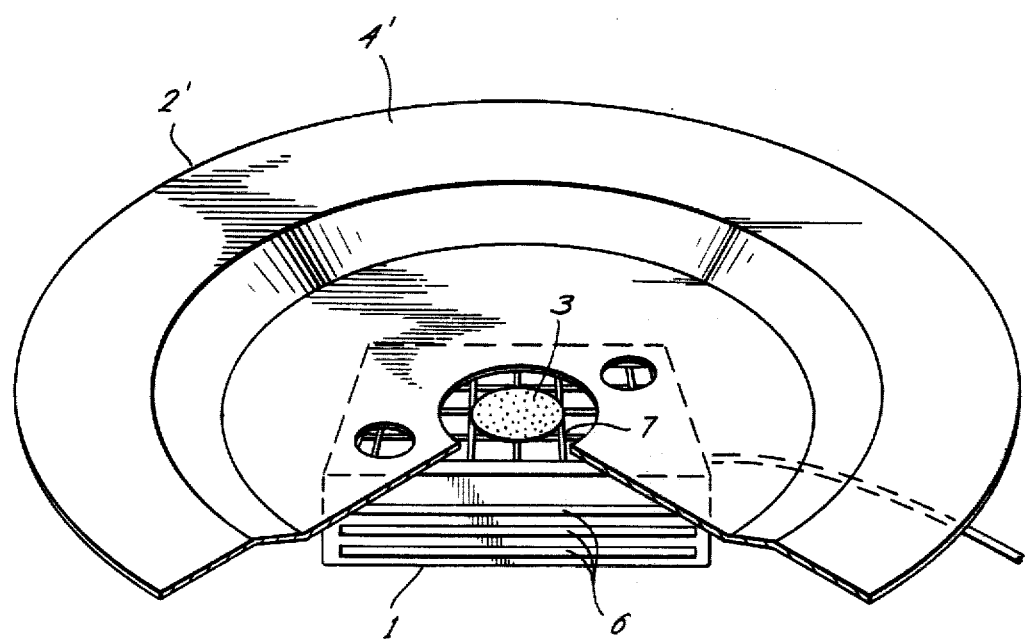
FIG. 3 is a perspective view, with portions removed, of a further embodiment of an insect trap according to the invention.

The insect trap shown in FIGS. 1 and 3 and partly in FIG. 2 comprises an electrically-powered heater unit 1, a chimney 2 (FIG. 1) or a cylindrical bowl-type enclosure 2' (FIG. 3), an insect attractant reservoir 3 and an inner sleeve 4 bearing a tacky substance (not shown) for trapping flying insects entering the bowl-type enclosure 2' or chimney 2.

The heater unit 1 comprises an electrical element (not shown) housed in a casing 5 which is provided with a number of slots 6 and above the element a grid 7 on which is placed the insect attractant reservoir 3 in the form of a round disc made from absorbent paper and impregnated with an insect attractant. Protruding from the top of the casing 5 are two lugs 8 and 9 for locating the chimney 2 in the correct position on the heater unit.

The chimney 2 as shown in FIG. 1 is rectangular in cross-section fully open at the base and provided with a re-entrant hole 10 at the top which is generally conically-shaped or has downwardly inwardly sloping walls 10a. Inside the bowl-type chimney 2' shown in FIG. 3 is an inner sleeve 4' which supports the tacky substance (not shown); the sleeve itself may be freestanding, i.e., supported on the grid 7, or may be clipped or otherwise fixed to the chimney 2. It will be understood that portions of the chimney 2' and sleeve 4' have been removed for illustration.

When the current is switched on and the heater unit 1 is warm a forced air draught is generated by air passing through the slits 6, through the grid 7, over the insect attractant reservoir 3, through the chimney 4 and, according to FIG. 1, out through the hole 10 into the surrounding atmosphere. Insect attractant vapor is taken with the air draught to form a stream of attractant vapor emanating from the top of the chimney 2. Flying insects of the type attracted to the particular attractant employed in the reservoir are lured to the trap, enter through the re-entrant hole 10, and are trapped by the tacky substance (glue: HYVIS-200) on the inner sleeve 4. Using the bowl-type modified chimney 2' as shown in FIG. 3, the forced air draught is generated by air passing over the bowl 4' and into the surrounding atmosphere. Insect attractant vapor is taken with the air draught to form a stream of attractant vapor emanating from the upper end of the bowl. Flying insects of the type attracted to the particular attractant employed in the reservoir are lured to the trap, and are trapped by the tacky substance which may be directly on the bowl 4' or on a separate removable inner sleeve or sheet (not shown) of paper or the like positioned on the bowl 4' and conforming in shape to the bowl 4' or a portion thereof, or having any other suitable configuration.

In the embodiment shown in FIG. 1 of the drawings, the tacky substance is mounted on the inner sleeve 4 and it has been found convenient to make this sleeve of a disposable material such as paper so that when it is fully loaded with dead flies it can be discarded and replaced by a fresh sleeve. It will also be appreciated that the sleeve may be of any convenient configuration and indeed could even take the shape of a flat sheet, if desired. In an alternative embodiment where an inner sleeve is not required the tacky substance can be mounted on the interior of the chimney and the chimney itself can be made of disposable material so that it also can be discarded and replaced with a fresh chimney when fully loaded.

In further alternative embodiments the chimney, or when used the inner sleeve, can have the insect attractant reservoir incorporated therein either in the sleeve or chimney or supported across the base of the sleeve or chimney so that it is positioned adjacent or close to the heater unit.

The insect trap according to the invention may in practice be sold as a kit which can be attached to an existing heater unit manufactured for the purposes of killing other insects, e.g., mosquitos, by vaporizing under the action of warmth generated by the heater a reservoir of a mosquito pesticide placed on the heater unit. It will be appreciated that the chimney including tacky substance together with the attractant reservoir could be readily adapted to fit on such an existing heater and thus the present invention also includes a kit for assembly into an insect trap comprising:

a chimney member adapted to allow a flow of air to be forced therethrough;

a reservoir of insect attractant which under the influence of the flow of air is evaporated and borne as a stream of attractant emanating from the chimney member into the surrounding atmosphere, and a tacky substance mounted on the inside of the chimney member or on another member capable of being located within the chimney member.

The said kit may include a chimney member made from thin card or cardboard in a "fold-flat" state but capable of being folded or shaped into the said chimney member.

As has been indicated above flying insects prefer entering a light area as opposed to a dark area and thus the chimney and interior sleeve could be made of transparent material. However, for aesthetic reasons, this is not an attractive design and the chimney is preferably made from opaque material, the outside being warm- or dark-colored and the interior (as well as the interior sleeve if present) being light in color. Further, the base of the chimney can be made of transparent material so as to illuminate the chimney interior. Alternatively, the heater unit may either be fabricated from transparent or light-colored material or have disposed around and above a grid the transparent wall which co-operates with the chimney and thus effectively produces a transparent base to the chimney.

As also stated above one important advantage of the present trap is the fact that it avoids the use of a chemical pesticide and relies on the tacky substance trapping and killing the flying insect. However, it may be desirable in certain circumstances to employ a pesticide inside the chimney in addition to the tacky substance and the invention also includes a trap containing such a pesticide for the flying insects trapped.

The action of the insect trap according to the invention will now be illustrated by reference to the following test:

The insect trap shown in FIGS. 1 and 2 of the drawings was placed in a 28 m$^3$ room maintained at 23° C. ($\pm$2° C.), 60% ($\pm$5%) relative humidity and ventilated at 3 air changes per hour. The attractant employed was a 7:3 weight mixture of (Z)-9-tricosene and (Z)-9-heneicosene which is an attractant for houseflies (*Musca domestica*) and a filter paper pad was loaded with 10 mg of this mixture, this pad then representing the attractant reservoir.

The trap was placed on a transparent table top 0.7 m above floor level and a number of free flying 2–3 day old milk-fed houseflies of mixed sexes was introduced into the room. The numbers of free-flying and trapped flies were counted and sexed three hours after the introduction of flies to the room and this procedure was repeated a number of times. The results are shown in the following Table.

| Test run | No. of flies used Male | No. of flies used Female | Catch (%) after 3 hours Male | Catch (%) after 3 hours Female | Catch (%) after 3 hours Total | Room temperature °C. |
|---|---|---|---|---|---|---|
| 1 | 15 | 4 | 60 | 25 | 53 | 24.0 |
| 2 | 11 | 9 | 100 | 56 | 80 | 25.2 |
| 3 | 19 | 1 | 84 | 100 | 85 | 24.0 |
| 4 | 14 | 8 | 100 | 25 | 73 | 25.0 |
| 5 | 10 | 13 | 100 | 69 | 83 | 23.5 |
| 6 | 19 | 3 | 84 | 33 | 77 | 20.3 |
| 7 | 16 | 7 | 81 | 29 | 65 | 20.2 |
| percentage catch of total flies used - | | | 86 | 47 | 73 | 23.2 |

It will be seen from the above results that an average of more than 70% of the free-flying house-fly population was successfully caught by the trap. This compares with a 9% catch when no attractant is used, and a nil catch when the heater is not in operation.

The foregoing disclosure and description of the invention are illustrative and explanatory thereof, and various changes in the size, shape and materials as well as in the details of the illustrated construction may be made without departing from the spirit of the invention.

What we claim is:

1. An insect trap, comprising:
   a chimney member;
   an electrically powered heater located underneath the base of said chimney member with the base of said chimney member being mounted directly to said heater so as to allow access thereto only through the top of said chimney;
   a reservoir containing an insect pheromone, located adjacent to and above said heater; and
   a tacky substance located inside said chimney member;
   whereby the heater evaporates the insect pheromone and generates a convection flow of air which carries the pheromone out of the top of the chimney into the surrounding atmosphere and the insects thereby lured by the pheromone through the top of the chimney become trapped by the tacky substance.

2. The insect trap of claim 1, wherein the insect pheromone is (Z)-9-tricosene.

3. The insect trap of claim 1, wherein the insect pheromone is a mixture of (Z)-9-tricosene and (Z)-9-heneicosene.

4. An insect trap according to claim 1, in which the chimney member is square, rectangular or circular in cross-section.

5. The insect trap according to claim 1, in which the chimney member is of a bowl-type enclosure.

6. The insect trap according to claim 1 in which the insect attractant is selected from a group consisting of:
   1,3-propanediol, 1-(3,4-methylenedioxylphenyl)-2-phenyl;
   3-cyclohexene-1-carboxylic acid, 6-methyl, 2-methylpentyl ester;
   4,7-methanoinden-6-ol-3a,4,5,6,7,7a-hexahydroformate;
   m-toluic acid, 2-methoxyethyl ester;
   m-toluic acid, 2-(2-butoxyethoxy) ethyl ester;
   pyran, tetrahydro-2-(2-propynyloxy); and feather meal hydrolysate.

7. An insect trap according to claim 1, in which the insect attractant is selected from a group consisting of:
   4-(p-hydroxyphenyl)-2-butanone acetate;
   cis-7,8-eposy-2-methyloctadecane;
   (Z)-7-hexadecen-1-ol-acetate;
   (Z)-7-dodecen-1-ol acetate;
   (Z)-7-dodecen-1-ol;
   4-allyl-1,2-dimethoxybenzene;
   phenethylpropionate+eugenol (7:3); and
   tert.-butyl-4-(or 5)-chloro-2-methylcyclohexane carboxylate.

8. An insect trap according to claim 1, in which the tacky substance is selected from a group consisting of: solutions of gum, rubber, and mineral oil, polybutenes and mixtures of wax and resins.

* * * * *